United States Patent
Wang et al.

(10) Patent No.: US 12,486,831 B2
(45) Date of Patent: Dec. 2, 2025

(54) OFFSHORE WIND POWER SINGLE PILE-FRICTION WING COMPOSITE FOUNDATION AND CONSTRUCTION METHOD THEREFOR

(71) Applicants: CHINA THREE GORGES CORPORATION, Beijing (CN); CHINA THREE GORGES RENEWABLES (GROUP) CO., LTD., Beijing (CN)

(72) Inventors: Wei Wang, Beijing (CN); Junyi Yan, Beijing (CN); Jianping Liu, Beijing (CN); Zechao Zhang, Beijing (CN); Guangming Yu, Beijing (CN)

(73) Assignees: CHINA THREE GORGES CORPORATION (CN); CHINA THREE GORGES RENEWABLES (GROUP) CO., LTD. (CN)

( * ) Notice: Subject to any disclaimer, the term of this patent is extended or adjusted under 35 U.S.C. 154(b) by 198 days.

(21) Appl. No.: 18/547,153

(22) PCT Filed: Aug. 31, 2021

(86) PCT No.: PCT/CN2021/115740
§ 371 (c)(1),
(2) Date: Aug. 19, 2023

(87) PCT Pub. No.: WO2022/174572
PCT Pub. Date: Aug. 25, 2022

(65) Prior Publication Data
US 2025/0003392 A1    Jan. 2, 2025

(30) Foreign Application Priority Data
Feb. 22, 2021   (CN) .......................... 202110197338.0
Feb. 22, 2021   (CN) .......................... 202120389043.9

(51) Int. Cl.
*F03D 13/25*   (2016.01)
*E02D 5/54*    (2006.01)
(Continued)

(52) U.S. Cl.
CPC ............... *F03D 13/25* (2016.05); *E02D 5/54* (2013.01); *E02D 7/02* (2013.01); *E02D 27/425* (2013.01);
(Continued)

(58) Field of Classification Search
CPC ..... F03D 13/25; E02D 27/425; E02D 27/525; E02D 5/54
See application file for complete search history.

(56) References Cited

FOREIGN PATENT DOCUMENTS

| | | | |
|---|---|---|---|
| CN | 106948360 | * | 7/2017 |
| EP | 3103924 | * | 12/2016 |

* cited by examiner

*Primary Examiner* — Sean D Andrish

(57) ABSTRACT

An offshore wind power single pile-friction wing composite foundation is provided, which includes a single pile and a friction wing being connected to the single pile through the force-conducting pipe, the tapered transition section of the single pile penetrates deep into the bearing stratum of the seabed, the force-conducting pipe of the friction wing located in the bearing stratum is in close contact with the tapered transition section of the single pile, the side wing of the friction wing is connected to the outer wall of the force-conducting pipe, and the ring wing is arranged inside the included angle of the side wing. There is a thorough structure in the axial direction of the friction wing, having convenience for embedding the bearing stratum of the seabed; the side wing and the ring wing support each other structurally to ensure the structural stability of the friction wing.

5 Claims, 8 Drawing Sheets

(51) Int. Cl.
*E02D 7/02* (2006.01)
*E02D 27/42* (2006.01)
*E02D 27/52* (2006.01)
*E02B 17/00* (2006.01)

(52) U.S. Cl.
CPC .... *E02D 27/525* (2013.01); *E02B 2017/0091* (2013.01); *E02D 2250/003* (2013.01); *E02D 2600/30* (2013.01); *F05B 2240/95* (2013.01)

OFFSHORE WIND POWER SINGLE PILE-FRICTION WING COMPOSITE FOUNDATION AND CONSTRUCTION METHOD THEREFOR

FIELD

The present invention belongs to the technical field of offshore wind power foundations and construction, and relates to an offshore wind power single pile-friction wing composite foundation and a construction method thereof.

BACKGROUND

The structures of a single pile foundation, a jacket foundation, a pile cap foundation and a tube foundation prevail in the offshore wind power foundations in China. The single pile foundation is a steel pipe pile sized in 6~10 m, which has the advantages such as simplifying structural load force, simply processing in production and construction and shortly timing construction, so it is the most commonly-used foundation type of the offshore wind farm within 30 m water depth, accounting for more than 80% of the foundation types of the built offshore wind farms in the world. However, for the sea areas off Fujian and Guangdong, the overburdens with the clay and sandy soil at partial machine sites are relatively shallow, and the anchorage depth of conventional single pile foundations often cannot meet the requirements of horizontal bearing capacity. Many enterprises and research institutes at home and abroad have proposed a variety of single pile composite foundations to improve the bearing capacity of single pile foundations, especially horizontal bearing capacity, for example a single pile and wing plate composite foundation (application number: 201020696951.4, 202010832220.6), a single pile-wing plate-rockfill composite foundation (application number: 201922299487.9), a single pile reinforced composite foundation (application number: 201921099318.4), a single pile and friction ring composite foundation (application number: 202011077473.3), a single pile and tube composite foundation (application number: 201710374499.6) and the likes. However, as to offshore wind farms having a quite thick silt layer above the seabed's overburden, the rockfill in the single pile and rockfill composite foundation, and the tube in the single pile and tube composite foundation are difficult to penetrate the silt layer and to be located in/embedded in the bearing stratum to effectively exert their supporting role, although the single pile and friction ring composite foundation can penetrate the silt layer, increasing the bearing capacity of the composite foundation only through the friction and the supporting force provided by the supporting wing plate and the friction ring, the friction ring only rests by means of the friction force and the unactive soil resistance between the structural wall and the surrounding soil, and the single pile and friction ring need to be manufactured, transported and constructed in their entirety, so their construction is difficult. As to deep offshore wind farms, since external loads such as wind, waves, and ocean currents are heavier, the wing structure in the single pile and wing plate composite foundation is prone to bending, twisting, and even buckling, so it cannot achieve the purpose of enhancing the horizontal bearing capacity of the single pile foundation. Therefore, there is an urgent need for a new offshore wind power single pile composite foundation that can be applied to both sea beds on shallow overburdens and sea beds covered with a quite thick silt layer, and has a high-efficient pile-soil interaction, as wells as is simply manufactured, transported and put in construction.

SUMMARY

The technical problem to be solved by the present invention is to provide an offshore wind power single pile-friction wing composite foundation and a construction method thereof, adopting a combination structure of a single pile and a friction wing, and having a simple structure and convenience for manufacturing, transportation and installation. The tapered transition section of the single pile penetrates deep into the bearing stratum of the seabed, and the force-conducting pipe of the friction wing located in the bearing stratum is in close contact with the tapered transition section of the single pile, so as to achieve the connection between the single pile and the friction wing. There is a thorough structure in the axial direction of the friction wing, having convenience for embedding the bearing stratum of the seabed, and the structure of the side wing and ring wing of the friction wing increases the interaction area between the composite foundation and the soil, and raises the horizontal and axial bearing capacity of the single pile-friction wing composite foundation. Moreover, the structure of the side wing and ring wing outside the friction wing makes full use of the soil arching effect to effectively raise the horizontal bearing capacity of the single pile-friction wing composite foundation.

In order to solve the above technical problem, the present invention adopts a technical solution, that is, an offshore wind power single pile-friction wing composite foundation, which includes a single pile and a friction wing, wherein the friction wing 2 is connected to the single pile 1 through the force-conducting pipe 21, the side wing of the friction wing is radially connected to the outer wall of the force-conducting pipe, and the ring wing is positioned outside the force-conducting pipe and connected to the side wing; the inner wall of the side wing and the ring wing and the outer wall of the force-conducting pipe form an axial thorough structure.

The lower end of the single pile is provided with a tapered transition section, the outer diameter of the upper edge of which is less than the inner diameter of the force-conducting pipe. and the outer diameter of the lower edge of which is greater than the inner diameter of the force-conducting pipe, and the friction wing is connected to the tapered transition section through the force-conducting pipe.

The side wing is a flat plate, preferably the outer and upper edges of its one side away from the force-conducting pipe are a V-shaped structure.

The ring wing is composed of a plurality of arc-shaped plates having an arc-shaped structure distributed in concentric circles, two adjacent arc-shaped plates are staggered or arranged in concentric circles, preferably the upper edge of the arc-shaped plate is a V-shaped structure.

The ring wing includes a vertical side plate, and the vertical side plate is connected with the side wing to form the ring wing having a polygonal structure.

The ring wing having a polygonal structure is a multi-tier structure, all concentric with the force-conducting pipe.

A construction method of the aforementioned offshore wind power single pile-friction wing composite foundation includes the steps of S1, piling, that is, using a pile-sinking device to pile the single pile into a designed anchorage depth in the seabed, and enabling the tapered transition section of the single pile to penetrate deep into the bearing stratum of the seabed;

S2, using a hoist to raise the friction wing, slowly releasing it from the upper end of the single pile, enabling the force-conducting pipe to cooperate with the upper end of the single pile, then slowly releasing the friction wing; after enabling the friction wing to penetrate the silt layer, releasing the connection between the friction wing and the hoist;

S3, using a hoist to lift the force-conducting device, slowly releasing it from the upper end of the single pile, after enabling the force-conducting device to contact with the friction wing, releasing the connection between the force-conducting device and the hoist;

S4, for the pile-sinking device, using the force-conducting device to pile the friction wing into the bearing stratum of the seabed to a designed embedding depth; at this time, enabling the inner wall of the force-conducting pipe to be in close contact with the lower part of the tapered transition section of the single pile; and S5, using a grouting device to fill mortar in the gap between the inner wall of the force-conducting pipe and the outer wall of the tapered transition section to form a fixed connection.

In a preferred embodiment, the lower end of the single pile is provided with a tapered transition section, the outer diameter of the upper edge of which is less than the inner diameter of the force-conducting pipe, and the outer diameter of the lower edge of which is greater than the inner diameter of the force-conducting pipe. The force-conducting pipe of the friction wing is positioned at the tapered transition section at the lower end of the single pile, and the inner wall of the force-conducting pipe is in close contact with the outer wall of the single pile, so as to improve the overall stability and structural strength.

In a preferred embodiment, the side wing is a flat plate, the outer and upper edges of its one side away from the force-conducting pipe adopt a V-shaped structure, the V-shaped structure gradually narrows downwards from the upper edge of the side wing, so it conduces to piling the friction wing into the bearing stratum of the seabed and reducing resistance.

In a preferred embodiment, the ring wing includes a plurality of arc-shaped plates having an arc-shaped structure distributed in concentric circles, two adjacent arc-shaped plates are staggered or arranged in concentric circles, preferably the upper edge of the arc-shaped plate is a V-shaped structure, the V-shaped structure gradually narrows downwards from the upper edge of the side wing, so it conduces to piling the friction wing into the bearing stratum of the seabed and reducing resistance. The side wing and the ring wing within an included angle form soil arching under load, and fully mobilize the horizontal resistance of the surrounding soil. According to numerical simulation, the horizontal bearing capacity of the single pile-friction wing composite foundation can increase by 50%-10% after making use of the "soil arching effect".

In a preferred embodiment, the side wing includes a vertical side plate or is a frame structure, the plate structure conduces to reducing the stress concentration of the friction wing, and the frame structure conduces to reducing the resistance of the friction wing during installation.

In a preferred embodiment, the inside of the side wing has multi-tier of concentric ring wings, which further improves the overall structural stability of the friction wing.

The present invention has the following advantages and positive effects:

1. Compared with the single pile and wing plate composite foundation, and the single pile and friction ring composite foundation, the single pile-friction wing composite foundation of the present invention has a larger interaction area with the soil in the bearing stratum. Furthermore, the trapezium-like structure formed by the exterior of the side wing and the ring wing conduces to the formation of "soil arching" for the friction wing, which further raises the horizontal resistance of the soil and effectively enhances the horizontal bearing capacity and axial bearing capacity of the single pile-friction wing composite foundation.

2. Compared with the single pile and friction ring composite foundation, the ring wing is located within the included angle between two side wings, and the adjacent ring wings are staggered, so the steel consumption for the single wing composite foundation significantly decreases, effectively reducing costs.

3. Compared with the single pile and wing plate composite foundation, the ring wing is located in the included angle between two side wings, providing a circumferential support for the side wing, and effectively abating the deformation of the side wing under the action of the soil pressure such as buckling, bending and twisting.

4. Compared with the single pile and tube composite foundation, the friction wing used in the present invention is a thorough structure in the vertical direction, having convenience for penetrating the silt layer to be embedded in the bearing stratum of the seabed, effectively decreasing the structural size of the friction wing in the vertical direction, and improving the applicability of the single pile-friction wing composite foundation to the seabed foundation.

5. The single pile and friction wing composite foundation presents independent structural components before assembly, effectively abating the difficulty of production and transportation, meanwhile proven technology about single pile construction is adopted to carry out construction step-by-step, providing simple construction.

BRIEF DESCRIPTION OF THE DRAWINGS

We shall further describe the present invention in combination with the drawings and examples as follows.

Where, 1-single pile; 11-tapered transition section; 2-friction wing; 21-force-conducting pipe; 22-side wing; 23-ring wing; 3-force-conducting device; 4-soil arching, 221-outer edge (221) of the side wings (22) 222-upper edge of the side wings (22).

DETAILED DESCRIPTION

Figure 1:
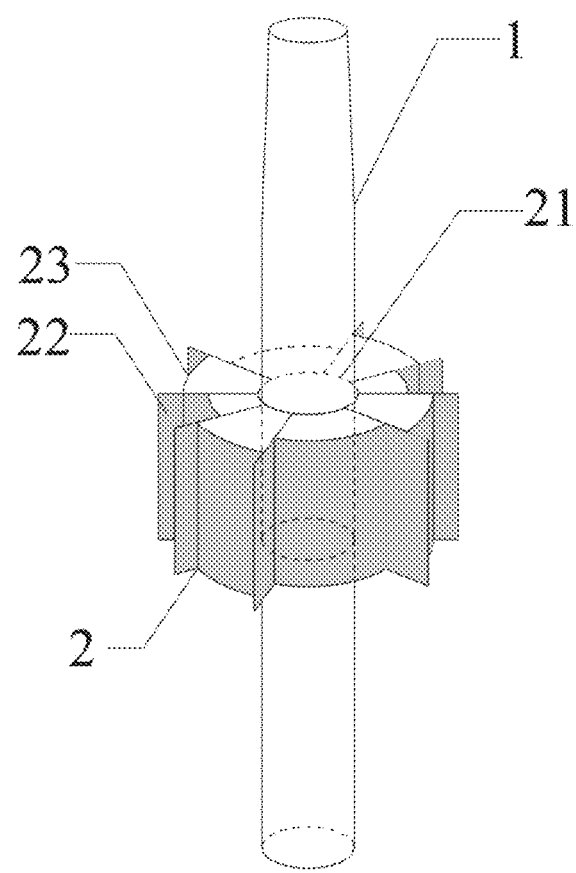
FIG. 1 is a structure diagram of the present invention.
Figure 2:
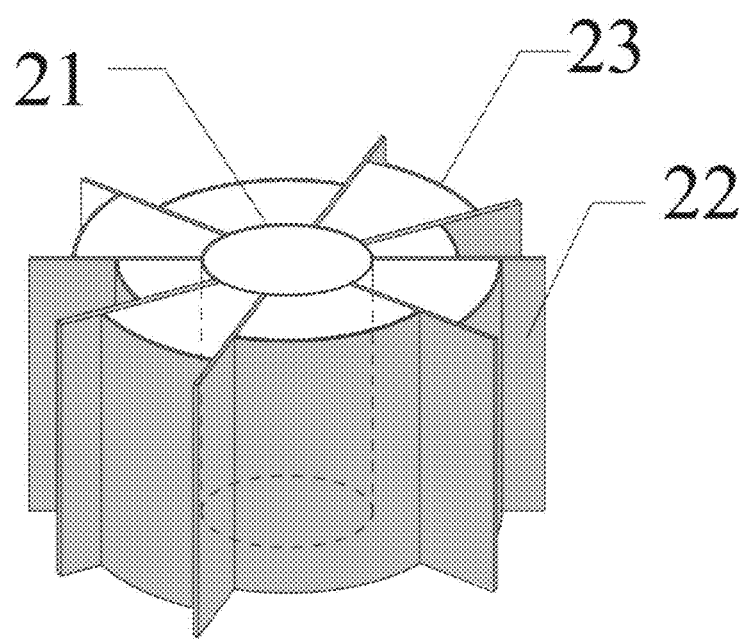
FIG. 2 is a structure diagram of the friction wing of the present invention.
Figure 3A:
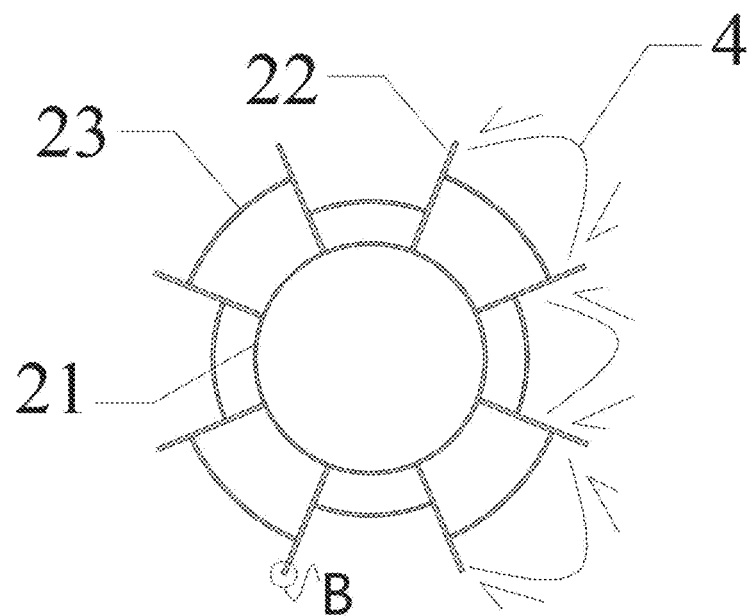
FIG. 3A is a top view of FIG. 2.
Figure 3B:
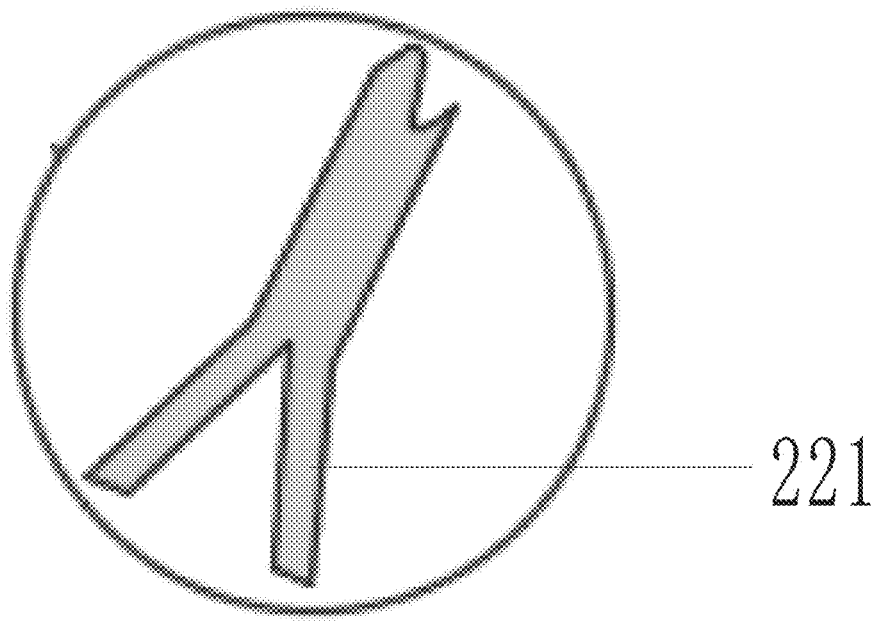
FIG. 3B is an enlarged view at B of FIG. 3A.
Figure 4:
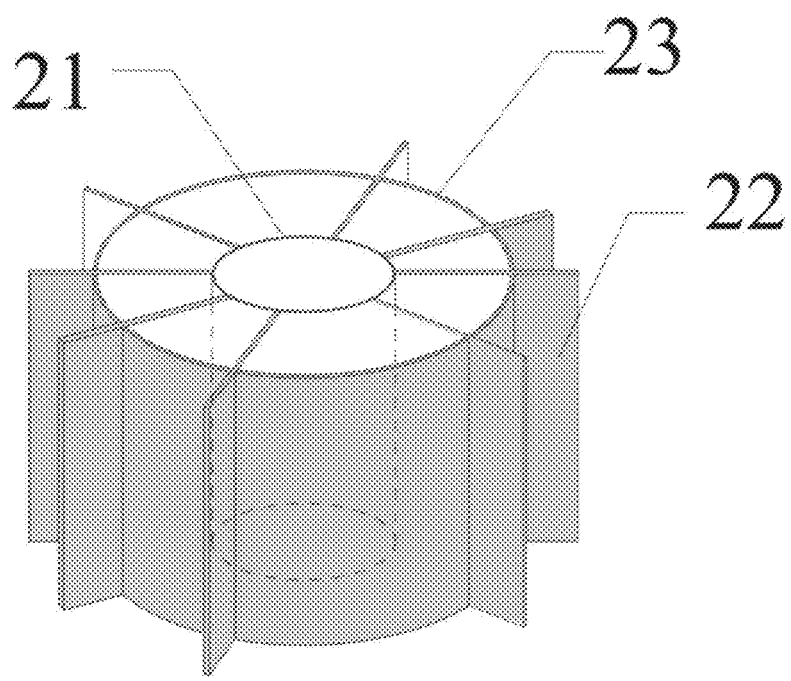
FIG. 4 is another structure diagram of the friction wing of the present invention.
Figure 5:
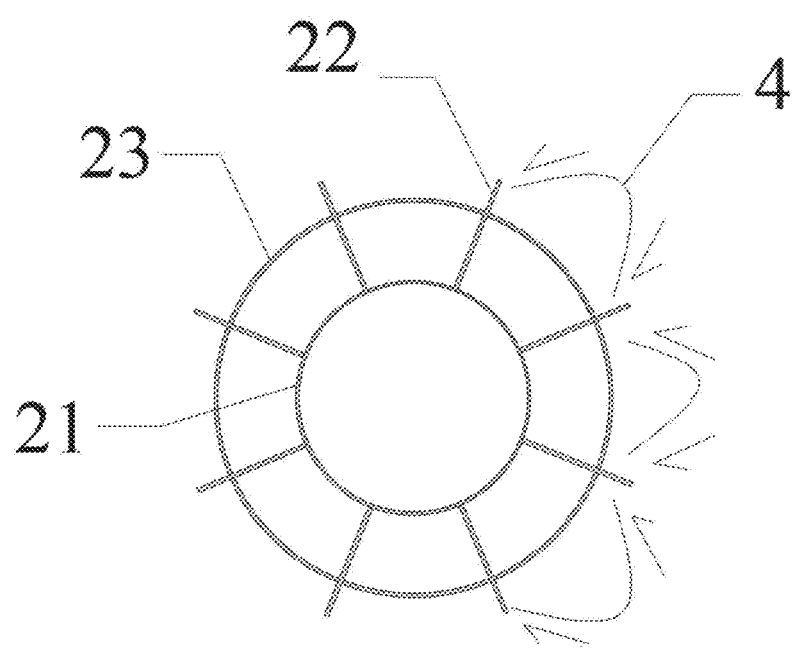
FIG. 5 is a top view of FIG. 4.
Figure 6:
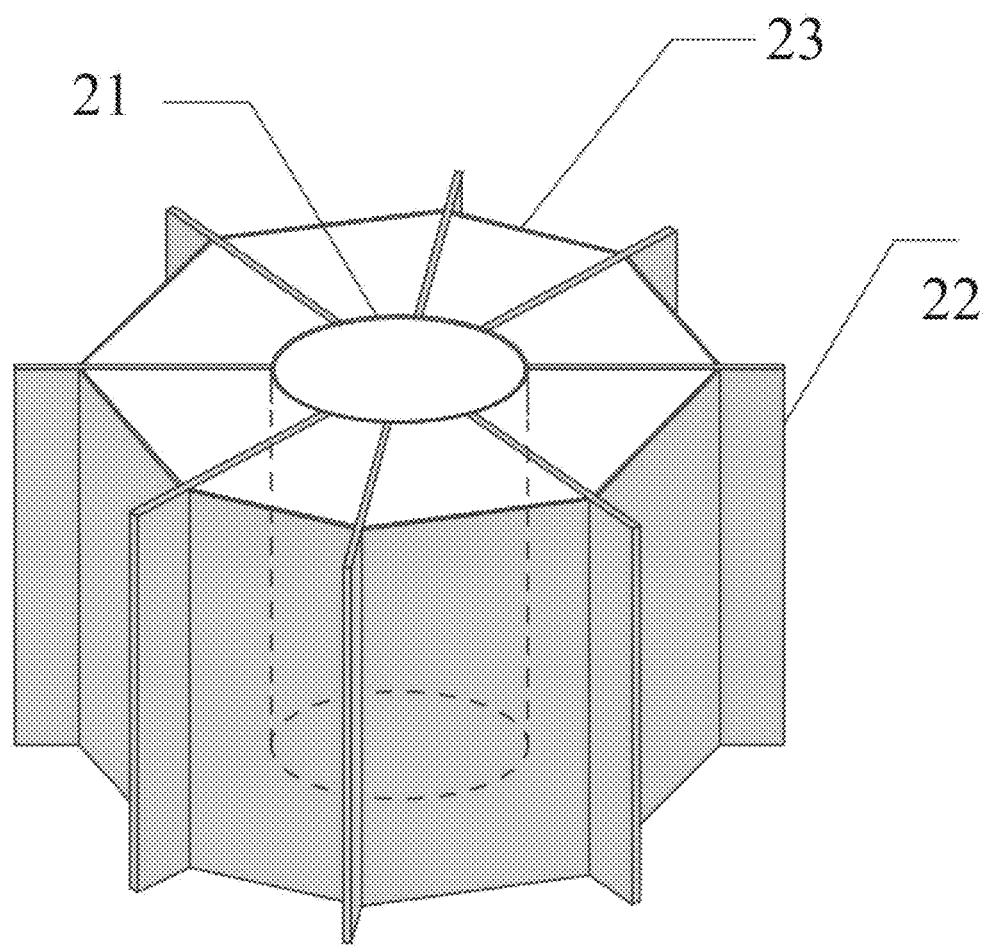
FIG. 6 is another structure diagram of the friction wing of the present invention.
Figure 7A:
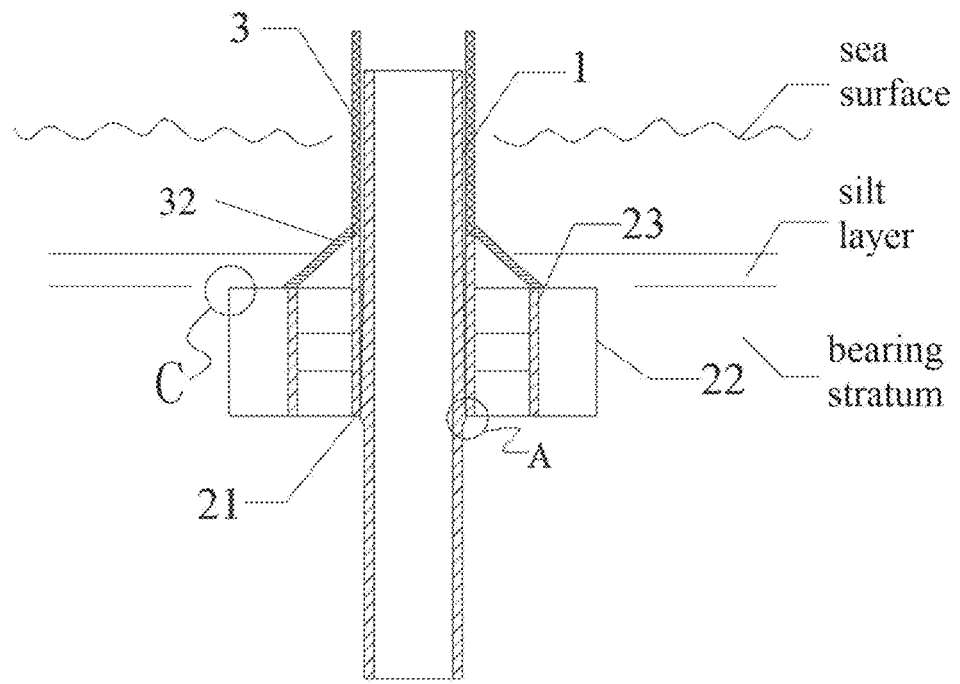
FIG. 7A is a state diagram of the present invention in use.
Figure 7B:
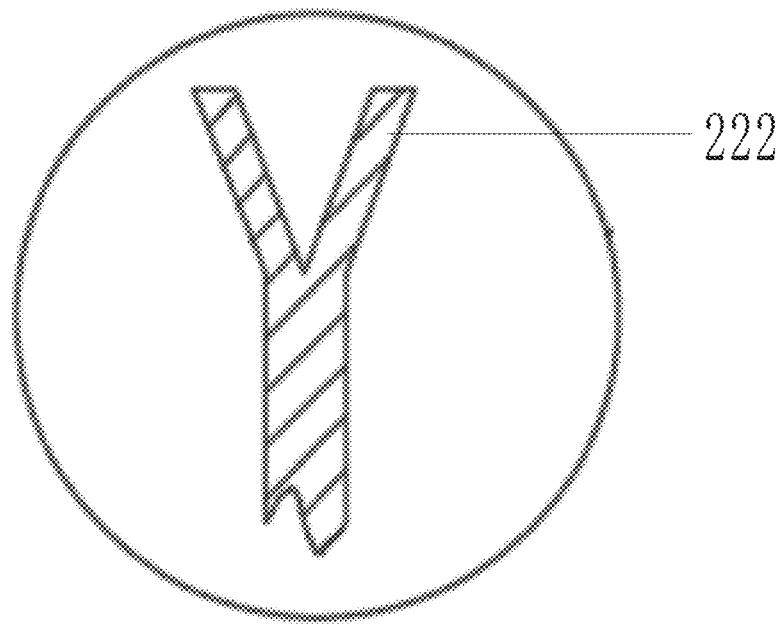
FIG. 7B is an enlarged view at C of FIG. 7A.
Figure 8:
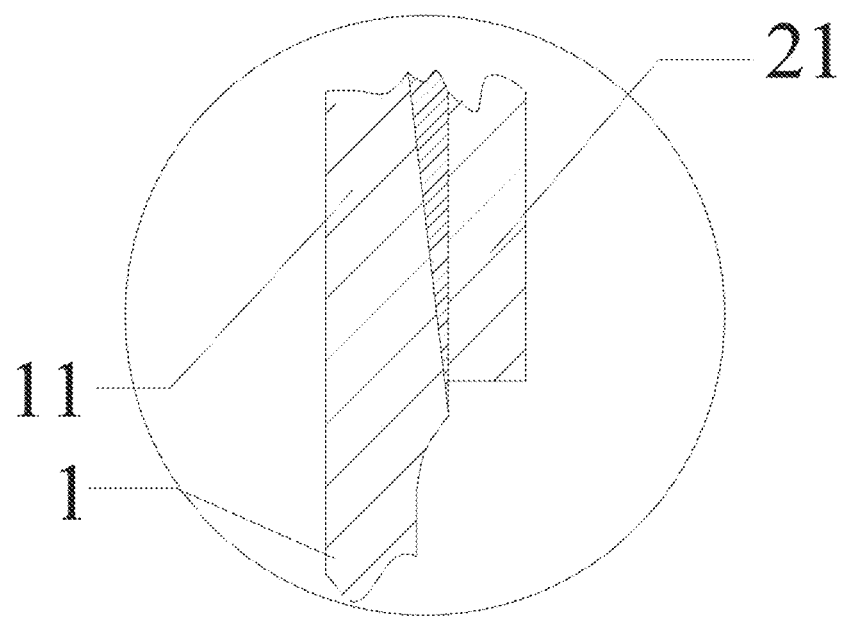
FIG. 8 is an enlarged view at A of FIG. 7.

As shown in FIGS. 1-8, an offshore wind power single pile-friction wing composite foundation includes the single pile 1 and the friction wing 2; wherein the friction wing 2 is connected to the single pile 1 through the force-conducting pipe 21, the side wing 22 of the friction wing 2 is radially connected to the outer wall of the force-conducting pipe 21, and the ring wing 23 is positioned outside the force-conducting pipe 21 and connected to the side wing 22; the inside of the side wing 22 and the ring wing 23 and the outer wall of the force-conducting pipe 21 form an axial thorough structure. The tapered transition section 11 of the single pile 1 penetrates deep into the bearing stratum of the seabed, the force-conducting pipe 21 of the friction wing 2 located in the bearing stratum is in close contact with the tapered transition section 11 of the single pile 1, there is a thorough structure in the axial direction of the friction wing 2, having convenience for embedding the bearing stratum of the seabed, and the structure of the side wing 22 and ring wing 23 of the friction wing 2 increases the interaction area between the composite foundation and the soil, moreover, the structure of the side wing 22 and ring wing 23 outside the friction wing 2 makes full use of the soil arching effect to effectively raise the horizontal bearing capacity of the single pile-friction wing composite foundation.

The friction wing 2 in the present invention is an axial thorough structure, the side wing 22 and the ring wing 23 with the bearing stratum generate soil resistance in the horizontal direction, and friction resistance in the vertical direction, so as to raise the horizontal bearing capacity, the anti-overturning moment and the axial bearing capacity of the single pile-friction wing composite foundation. The friction wing makes use of the "soil arching effect" to further raise the horizontal and axial bearing capacity of the single pile-friction ring composite foundation, and decrease the anchorage depth of single pile 1, so as to make it suitable for the sea beds on shallow overburdens. The friction wing 2 is a thorough structure in the axial direction, having convenience for penetrating the silt layer into the bearing stratum, so as to make it suitable for the seabed where the overlaying soil is a quite thick silt layer. The side wing 22 and the ring wing 23 support each other structurally to ensure the structural stability of the friction wing 2.

Specifically, the lower end of the single pile 1 is provided with the tapered transition section 11, the outer diameter of the upper edge of which is less than the inner diameter of the force-conducting pipe 21, and the outer diameter of the lower edge of which is greater than the inner diameter of the force-conducting pipe 21, ensuring close contact between the force-conducting pipe 21 and the single pile 1, and the friction wing 2 is connected to the tapered transition section 11 through the force-conducting pipe 21.

Specifically, the side wing 22 is a flat plate; preferably the outer and upper edges of its one side away from the force-conducting pipe 21 are a V-shaped structure.

Specifically, the ring wing 23 is composed of a plurality of arc-shaped plates having an arc-shaped structure distributed in concentric circles, two adjacent arc-shaped plates are staggered or arranged in concentric circles, preferably the upper edge of the arc-shaped plate is a V-shaped structure.

Specifically, the ring wing 23 is a vertical side plate, and the vertical side plate is connected with the side wing 22 to form the ring wing 23 having a polygonal structure.

Specifically, the ring wing 23 having a polygonal structure is a multi-tier structure, all concentric with the force-conducting pipe 21. The distance between the innermost ring wing 23 and the force-conducting pipe 21 is greater than the unactive soil's pressure range of the force-conducting pipe 21 under load, so that the single pile 1 and the force-conducting pipe 21 can fully mobilize the soil resistance around the pile.

Specifically, the force transmission pipe 21 is pre-welded on the outer wall of the single pile 1, and the friction wing 2 and the single pile 1 are constructed in their entirety.

The construction method of the aforementioned offshore wind power single pile-friction wing composite foundation includes the steps of:

S1, piling, that is, using a pile-sinking device to pile the single pile 1 into a designed anchorage depth in the seabed, and enabling the tapered transition section 11 of the single pile 1 to penetrate deep into the bearing stratum of the seabed;

S2, using a hoist to raise the friction wing 2, slowly releasing it from the upper end of the single pile 1, enabling the force-conducting pipe 21 to cooperate with the upper end of the single pile 1, then slowly releasing the friction wing 2; after enabling the friction wing 2 to penetrate the silt layer, releasing the connection between the friction wing 2 and the hoist;

S3, using a hoist to lift the force-conducting device 3, slowly releasing it from the upper end of the single pile 1, after enabling the subsidiary pipe 32 to contact with the friction wing 2, releasing the connection between the force-conducting device 3 and the hoist;

S4, for the pile-sinking device, using the force-conducting device 3 to pile the friction wing 2 into the bearing stratum of the seabed to a designed embedding depth; at this time, enabling the inner wall of the force-conducting pipe 21 to be in close contact with the tapered transition section 11 of the single pile 1; and S5, using a grouting device to fill mortar in the gap between the inner wall of the force-conducting pipe 21 and the outer wall of the tapered transition section 11 to form a fixed connection.

The aforementioned examples are only a preferred technical solution of the present invention, and should not be regarded as a limitation on the present invention: the examples in the present invention and the features in the examples may be arbitrarily combined with each other without conflict. The protection scope of the present invention shall be limited to the technical solution described in the claims, including the equivalent replacement of the technical features of the technical solution described in the claims. That is, an equivalent replacement improvement within this scope also falls within the protection scope of the present invention.

What is claimed is:

1. An offshore wind power single pile-friction wing composite foundation, comprising a single pile (1) and a friction wing (2), wherein the friction wing (2) comprises a plurality of side wings (22) and a plurality of ring wings (23), the friction wing (2) is connected to said single pile (1) through a force-conducting pipe (21), each of the plurality of the side wings (22) is radially connected to an outer wall of said force-conducting pipe (21), and each of the plurality of the ring wings (23) is positioned outside the force-conducting pipe (21) and arranged concentrically with the force-conducting pipe (21), each of the plurality of the ring wings (23) is an arc-shaped plate which is arranged concentrically with the force-conducting pipe (21), two ends of each of the plurality of the ring wings (23) are connected to two adjacent side wings (22), two adjacent ring wings (23) are configured to be staggered, and an inner wall of each side wing (22) and each ring wing (23) and the outer wall of said force-conducting pipe (21) form an axial through hole.

2. The offshore wind power single pile-friction wing composite foundation according to claim 1, wherein a lower end of said single pile (1) is provided with a tapered transition section (11), an outer diameter of an upper edge of the tapered transition section (11) is less than an inner diameter of said force-conducting pipe (21), and an outer diameter of a lower edge of the tapered transition section (11) is greater than the inner diameter of said force-conducting pipe (21), and said friction wing (2) is connected to said tapered transition section (11) through said force-conducting pipe (21).

3. The offshore wind power single pile-friction wing composite foundation according to claim 1, wherein each side wing (22) is a flat plate, one side of each of the plurality of the side wings (22) is connected to the outer wall of said force-conducting pipe (21), and an outer edge (221) of other side of each of the plurality of the side wings (22) is a V-shaped structure, and an upper edge (222) of the other side of each of the plurality of the side wings (22) is a V-shaped structure.

4. The offshore wind power single pile-friction wing composite foundation according to claim 1, wherein each of the plurality of the ring wings (23) is a vertical side plate, and the vertical side plate is connected with the two adjacent side wings (22).

5. A construction method of the aforementioned offshore wind power single pile-friction wing composite foundation according to claim 1, comprising the steps of:

S1, using a pile-sinking device to pile the single pile (1) into a designed anchorage depth in a seabed, and enabling the tapered transition section (11) of the single pile (1) to penetrate deep into a bearing stratum of the seabed;

S2, using a hoist to raise the friction wing (2), slowly releasing the friction wing (2) from an upper end of the single pile (1), enabling the force-conducting pipe (21) to cooperate with the upper end of the single pile (1), then slowly releasing the friction wing (2); after enabling the friction wing (2) to penetrate a silt layer, releasing a connection between the friction wing (2) and the hoist;

S3, using the hoist to lift a force-conducting device (3), slowly releasing the force-conducting device (3) from the upper end of the single pile (1), after enabling the force-conducting device (3) to contact with the friction wing (2), releasing a connection between the force-conducting device (3) and the hoist;

S4, for the pile-sinking device, using the force-conducting device (3) to pile the friction wing (1) into the bearing stratum of the seabed to a designed embedding depth; at this time, enabling an inner wall of the force-conducting pipe (21) to be in close contact with a lower part of the tapered transition section (11) of the single pile (1); and S5, using a grouting device to fill mortar in a gap between the inner wall of the force-conducting pipe (21) and an outer wall of the tapered transition section (11) to form a fixed connection.

\* \* \* \* \*